Patented Aug. 19, 1952

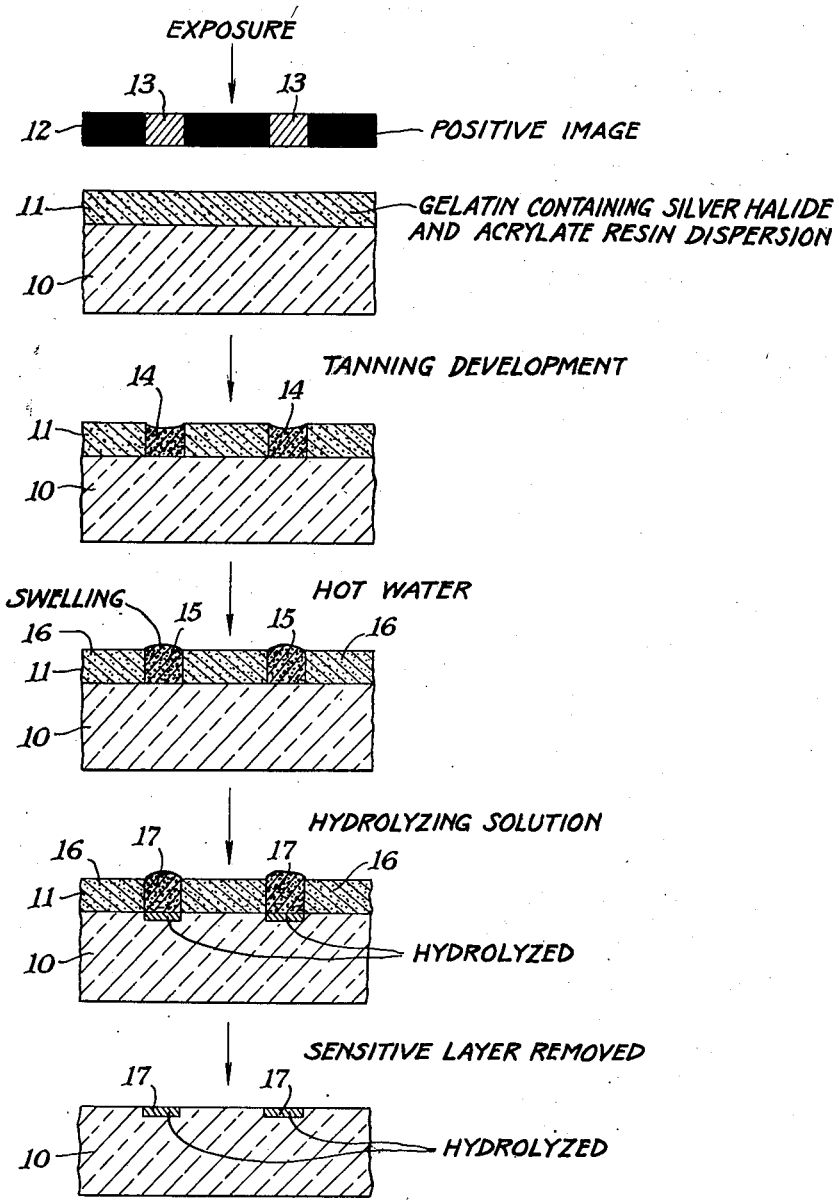

2,607,683

UNITED STATES PATENT OFFICE 2,607,683

METHOD OF MAKING A HYDROLYZED CELLULOSE ESTER PRINTING PLATE

Edward C. Yackel and Charles F. Amering, Rochester, N. Y., assignors to Eastman Kodak Company, Rochester, N. Y., a corporation of New Jersey Application August 18, 1949, Serial No. 111,008
In Great Britain July 25, 1949

5 Claims. (Cl. 95—5.4)

This invention relates to lithography and particularly to a method of making a photolithographic printing plate.

It is known that lithographic plates may be made from cellulose ester films by hydrolyzing or saponifying the film imagewise. The plate thus prepared has hydrolyzed areas and unhydrolyzed areas, the former repelling and the latter accepting greasy printing ink.

We have discovered a simple and convenient method of making a hydrolyzed cellulose ester printing plate which involves the use of a novel sensitizing medium.

Our novel method comprises using a silver halide sensitized hydrophilic colloid layer for example, gelatin, containing an aqueous colloidal dispersion of a water-insoluble soft acrylate resin as the sensitizing medium for a substantially fully esterified cellulose organic acid ester plate. The advantages of this method will be fully described below.

A similar process is disclosed in the copending Staehle and Amering U. S. Patent application Serial No. 39,218, filed July 17, 1948, now U. S. Patent No. 2,484,431, granted October 11, 1949, wherein dichromate is utilized for imparting light sensitivity to the sensitive medium.

The accompanying drawings show enlarged sectional views of a cellulose ester printing plate at various stages in our process.

The cellulose ester sheet used in our process to make the lithographic printing plate is a hydrolyzable cellulose organic acid ester such as cellulose acetate, cellulose acetate propionate or cellulose acetate butyrate. The cellulose ester should be substantially fully esterified and preferably should contain not more than about 1 per cent of hydroxyl groups. A preferred ester is cellulose triacetate containing approximately 42.5 per cent of acetyl groups.

The sensitive medium applied to the cellulose ester plate consists of a hydrophilic colloid differentially tannable under the influence of light, such as a low grade of gelatin, gum arabic, fish glue, etc., containing silver halide and an aqueous colloidal dispersion of a water-insoluble, soft acrylate resin. These acrylate dispersions consist of a resin such as polymethyl acrylate or polyethyl acrylate dispersed in water and containing a dispersing agent such as the sodium salt of an alkyl aryl polyether sulfonate; the resin comprising from 25 to 50 per cent by weight of the aqueous dispersion. The dispersions are sold under the trade names Rhoplex or Acrysol. The resin dispersion is mixed with the gelatin or other hydrophilic colloid in amounts of from about 3 to 15 parts of dry resin per part hydrophilic colloid. When gelatin is used as the hydrophilic colloid, the most useful range of resin gelatin is from about 93% resin/7% gelatin to 78% resin/22% gelatin. These ranges may vary appreciably depending on the materials used and other factors such as the degree of dispersion of the resin, larger particle sizes requiring a somewhat higher ratio of resin to gelatin and the smaller particle sizes requiring a lower ratio of resin to gelatin than indicated. When a tannable hydrophilic colloid other than gelatin is used, ratios of the order indicated give useful results.

The silver/gelatin ratio is less critical but when ratios much higher than given in the following example are used, there is a tendency toward coagulation of the coating mixture. Appreciably lower ratios tend to make the differential hydrolysis more difficult and yield plates of poor quality. Some consideration should be given to coating thickness to obtain optimum quality. For example, the best results are obtained using from about 0.3 to 0.7 gm. dry resin per square foot although useful results are obtained outside this range; the thicker coatings impede hydrolysis and with thinner coatings poor differentiation in the hydrolysis of the support is obtained.

The sensitizing mixture of gelatin, silver halide and resin is coated on the cellulose ester sheet and after drying is exposed to a positive image from the sensitive side, the exposure being sufficient to strike through to the support. For halftone work the exposure may be screened for example by means of a vignetted screen. Following exposure the element is developed in a tanning developing composition which hardens the colloid layer in the exposed regions. After development the element is neutralized in an acetic acid stop bath, then treated with hot water for example by immersing in water for a minute or two as is required. By "hot water" we mean water at a temperature of from about 100–140° F.

Hot water causes swelling and softening of the exposed areas of the sensitive layer. Because the gelatin has been hardened by development in these areas, it is not washed out but is merely swollen by the action of the water. In the unexposed areas the gelatin has not been hardened and the water dissolves the gelatin and other soluble constituents out of the unexposed areas although some gelatin probably washes out in the earlier processing steps. At the same time the resin particles in the unexposed areas coalesce to form a continuous film well bonded to the support. The support is therefore protected by a layer of water-insoluble resin where the sensitive layer has not been exposed. The element is then preferably squeegeed and dried before immersion in a hydrolyzing solution, for example, a solution of sodium hydroxide in ethyl alcohol and water for from one to fifteen minutes. The exposed areas of the sensitive layer containing the swollen gelatin have practically no resistance to the penetration of the hydrolyzing solution while the areas which correspond to the unexposed part offer substantial resistance to the hydrolyzing solution because the coating of resin has coalesced and adheres tenaciously to the support. After sufficient time for hydrolysis, the film is rinsed in water and the layer is removed with a solvent such as toluene, leaving the cellulose ester sheet having hydrolyzed and unhydrolyzed areas in accordance with the image which existed in the sensitive layer.

Our invention will be further described by reference to the accompanying drawing which shows in enlarged cross sectional view a film at various stages in our process.

As shown by the diagram a support, 10, for example, of cellulose tri-acetate having an acetyl content of about 42.5 per cent and 0.0055-inch thick is coated with a thin layer 11 of gelatin containing silver halide and an aqueous colloidal dispersion of an acrylate resin. After drying, this coating is exposed to light under a positive image 12 having clear areas 13 to allow transmission of light.

The element is then developed in a tanning developer until the exposed areas are hardened with the results shown in the second stage of the drawing, the exposed areas 14 of layer 11 now containing the silver and tanned colloid image 14.

The element is then treated by immersion in a stop bath of acetic acid and then hot water for a time sufficient to swell the developed areas 14 and extract the gelatin from the remaining regions of the sensitive layer. The layer 11 now contains the swollen image 15 and the region 16 contains coalesced acrylate resin substantially free of gelatin as shown in the third stage of the drawings.

The swollen element is then preferably dried and treated with a hydrolyzing solution which penetrates only areas 15 causing hydrolysis of the support 10 at areas 17 but not in the unexposed regions beneath portion 16.

The tanned areas are readily wiped off and the resist areas are removed by swabbing with a solvent such as toluene, leaving the hydrolyzed portion at 17 which, when wet, repels printing ink, the remaining areas of the plate accepting the ink and serving as the printing areas.

Our invention will be further illustrated by reference to the following specific example.

A cellulose tri-acetate film support consisting of 0.0055-inch thick cellulose triacetate containing about 42.5 per cent acetyl was coated with a layer of sensitizing material from the following solution: An emulsion was prepared by pouring streams of aqueous solutions of silver nitrate and 5 per cent excess alkali metal halide into an aqueous gelatin solution at 50° C. over a period of five minutes and then cooling to 40° C. One liter of this silver halide emulsion containing the equivalent of 40 grams of silver and 70 grams of gelatin was combined with 800 grams of an aqueous dispersion of acrylate resin.

The sensitive composition was coated so as to cover 800 square feet of the film support. The coated layer was dried and exposed under a positive. An exposure with a 100-watt lamp at 30 inches under a line positive or screened halftone positive, for one second, is satisfactory. When using vignetted screens about five seconds exposure with a photoflood lamp is required. The element was then developed for about 20 seconds at room temperature with agitation in a tanning developer of the following composition.

Solution A

| | Grams |
|---|---|
| Pyrogallol | 200 |
| p-Methylaminophenol sulfate | 120 |
| Potassium bromide | 80 |
| Water to 10 liters. | |

Solution B

| | Grams |
|---|---|
| Sodium carbonate (des.) | 3600 |
| Sodium sulfite | 1000 |
| Water to 20 liters. | |

To Solution A may further be added organic antifoggant compounds if desired and it is advisable to incorporate a water softener in Solution B. In use in our process mix 1 to 2 parts of B and 1 part of A to obtain the tanning developer solution. Development time may be varied somewhat depending upon the results desired but ordinarily from ten seconds to one minute development will be satisfactory.

Following development, the film was immersed in a 5 per cent acetic acid bath for a short time, then treated with water at 104° F. to swell the exposed region, then squeegeed and dried. The film was then immersed for three minutes at 104° F. in a hydrolyzing solution having the following composition.

| | | |
|---|---|---|
| Sodium hydroxide | grams | 100 |
| Ethyl alcohol (95%) | do | 800 |
| Water | cubic centimeters | 1200 |

The hydrolyzing time may be varied, but from 1½ to 12 minutes is generally used, 300 line screen work generally requiring about 1½ minutes and bold line work requiring ten to twelve minutes.

After hydrolyzing, the film was removed from the hydrolyzing bath, rinsed in water, and the resist layer was then removed with toluene. The plate which resulted had hydrolyzed areas where the sensitive layer has been exposed which areas repelled ink and unhydrolyzed areas which attracted ink when the plate was wetted and inked with a greasy printing ink.

In the above process if desired, the tanning developing agent such as pyrogallol may be incorporated in the sensitive layer and tanning development may be carried out subsequent to exposure by merely treating the exposed layer with an alkaline solution such as sodium hydroxide or sodium carbonate solution.

In the most satisfactory operation of our process the cellulose ester support carrying the silver halide sensitized colloid layer is provided with an antihalation layer. This may be in the form of a dye layer on the back of the support or the support itself may be dyed. For imparting maximum dimensional stability to the printing plate the support is affixed to non-extensible sheeting such as sheet aluminum or aluminum foil. This may be accomplished by laminating the cellulose ester support to the metal sheet prior to application of the sensitive layer or the cellulose ester may be coated on the metal sheet or foil and the sensitive layer applied over it.

The advantages of our process over prior art processes is now apparent. First, there is made available a direct-positive process which process does not necessitate removal of exposed areas before hydrolyzing or etching the support. In our process these areas need not be removed although under certain conditions the hot water swelling step may cause the exposed areas to break off but this is not detrimental and usually does not occur unless relatively large amounts of hydrophilic colloid are present in the original sensitive layer. Also, all of the advantages of silver sensitized emulsions compared to dichromated colloid are manifest in our process. Since silver halide is used, rather than dichromate as in the co-pending Staehle and Amering process, the sensitive layer has greater sensitivity and latitude than is obtainable with dichromate sensitized systems. Furthermore, and most important, the initial sensitized product has considerably better stability under adverse conditions of temperature and humidity. It is well known that dichromatic systems are very unstable. This means that our sensitive product may be supplied to the trade in a pre-sensitized condition with assurance to the user that useful results can be obtained even after long periods of storage under adverse conditions. Finally, preliminary tests indicate that the final printing plate shown in the last stage of the drawing tends to produce prints of higher quality than when the plate is made by other processes including the co-pending Staehle and Amering process. Moreover, a plate prepared by our process will give good prints long after the plate has been prepared.

Our invention having been described we would have it understood that the disclosure herein is by way of example only and that our invention is to be taken as limited only by the scope of the appended claims.

What we claim is:

1. The method of making a photolithographic printing plate which comprises coating a substantially fully esterified cellulose organic acid ester support with a layer of hydrophilic colloid containing silver halide and an aqueous colloidal dispersion of from about 3 to 15 parts of a water-insoluble, soft, acrylate resin per part of hydrophilic colloid, exposing the sensitive colloid layer to light under an image, developing the exposed layer under conditions of tanning development, treating the developed layer with hot water to swell the colloid in the exposed regions of the layer and to remove hydrophilic colloid from the unexposed regions without removing the resin, treating the layer with a hydrolyzing solution to hydrolyze the portions of the cellulose ester support beneath the exposed regions of the colloid layer and removing all of the colloid layer and resin from the support.

2. The method of making a photolithographic printing plate which comprises coating a substantially fully esterified cellulose acetate support with a layer of gelatin containing silver halide and an aqueous dispersion of from about 3 to 15 parts of a water-insoluble, soft, acrylate resin per part of gelatin, exposing the sensitive layer to light under an image, developing the exposed layer in a tanning developer, treating the developed layer with hot water to swell the colloid in the exposed regions and to remove gelatin from the unexposed regions of the layer without removing the resin, treating the layer with a hydrolyzing solution to hydrolyze the portions of the cellulose ester support beneath the exposed regions of the colloid layer and removing all of the colloid layer and resin from the support.

3. The method of making a photolithographic printing plate which comprises coating a substantially fully esterified cellulose acetate support with a layer of gelatin containing silver halide and an aqueous dispersion of from about 3 to 15 parts of a polyethyl acrylate resin per part of gelatin, exposing the sensitive layer to light under an image, developing the exposed layer in a tanning developer, treating the developed layer with hot water to swell the colloid in the exposed regions of the layer and to remove gelatin from the unexposed regions of the layer without removing the resin, treating the layer with a hydrolyzing solution to hydrolyze the portions of the cellulose ester support beneath the exposed regions of the colloid layer and removing all of the colloid layer and resin from the support.

4. The method of making a photolithographic printing plate which comprises coating a substantially fully esterified cellulose acetate support with a layer of gelatin containing silver halide and an aqueous dispersion of a polyethyl acrylate resin, the amount of resin in said layer being from 3 to 15 times the amount of gelatin, exposing the sensitive layer to light under an image, developing the exposed layer in a tanning developer, treating the developed layer with hot water to swell the colloid in the exposed regions of the layer and to remove the gelatin from the unexposed regions of the layer without removing the resin, treating the layer with a hydrolyzing solution to hydrolyze the cellulose acetate support beneath the exposed regions of the layer and removing all gelatin and resin from the support.

5. The method of making a photolithographic printing plate which comprises coating a substantially fully esterified cellulose acetate support with a layer of gelatin containing silver halide and an aqueous dispersion of from about 3 to 15 parts of a polyethyl acrylate resin per part of gelatin, exposing the sensitive layer to light under an image, developing the exposed layer in a tanning developer, treating the developed layer with hot water to swell the colloid in the exposed regions of the layer and to remove gelatin from the unexposed regions of the layer without removing the resin, treating the layer with an alcoholic alkali hydrolyzing solution to hydrolyze the cellulose acetate support beneath the exposed regions of the colloid layer and removing all gelatin and resin from the support.

EDWARD C. YACKEL.
CHARLES F. AMERING.

REFERENCES CITED

The following references are of record in the file of this patent:

UNITED STATES PATENTS

| Number | Name | Date |
| --- | --- | --- |
| 2,484,431 | Staehle | Oct. 11, 1949 |
| 2,500,052 | Yackel | Mar. 7, 1950 |